United States Patent Office 2,700,580
Patented Jan. 25, 1955

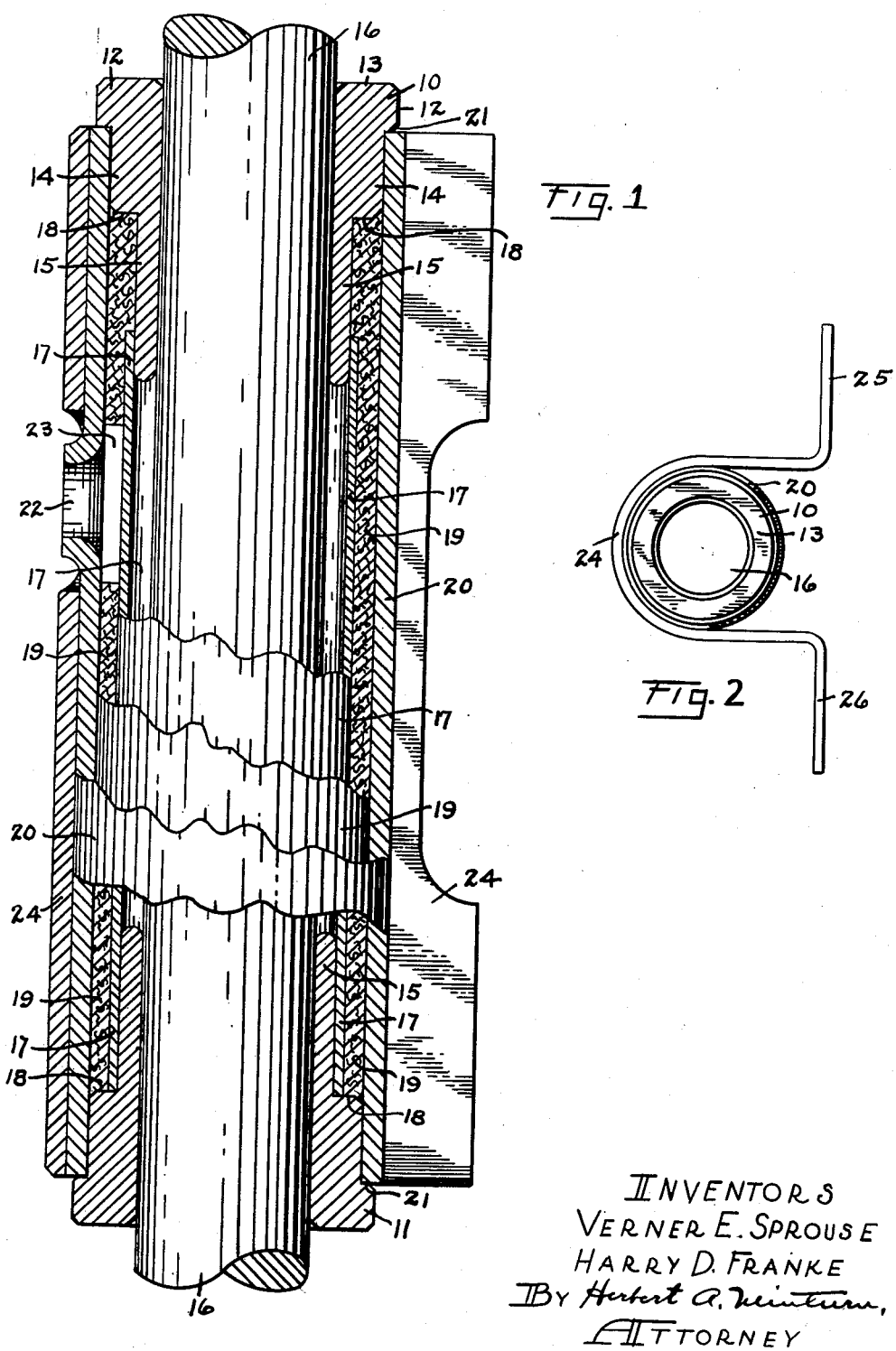

2,700,580

RADIAL THRUST BEARING

Verner E. Sprouse and Harry D. Franke, Columbus, Ind., assignors to Vernco Corporation, Columbus, Ind., a corporation of Indiana Application February 26, 1953, Serial No. 338,952

4 Claims. (Cl. 308—121)

This invention relates to a radial, sleeve type bearing which may take not only radial loads but thrust loads if desired, and wherein there are two spaced apart porous bronze bushings maintained in alignment and in spacing by two cylindrical walls having an annular chamber therebetween within which chamber is carried a felt tubing or wicking to maintain a reservoir of oil, all in the manner wherein the felt tubing or wicking is maintained out of contact with any revolving parts, and wherein there may be arranged for a selected feed of oil from the tubing into either one or both of the bronze bushings.

A primary object of the invention is to provide a structure of the type above indicated wherein there may be extremely long life obtained from the bearing, without the necessity of using ball bearings, and wherein proper lubrication may be maintained at all times, including an automatic increase of feed of oil upon temperature rise at the respective bearing bushings.

A further important object of the invention is to provide a single structure which may be used interchangeably for horizontally or vertically positioned shafts, the means for providing the control of the supply of the lubricant to the bearing being selective in that the greater oil supply will be to the bearing taking the greater load.

These and many other objects and advantages of the invention, including the fact that the bearing will operate in a noiseless manner as opposed to ball bearings or roller bearings, will become apparent to those versed in the art in the following description of one particular form of the invention as illustrated in the accompanying drawing, in which Fig. 1 is a view in central diametrical section through a structure embodying the invention, which structure is illustrated in the shaft vertical position; and Fig. 2 is an end elevation of the structure on a much reduced scale.

Bronze bushings 10 and 11 are selected to be substantially identical in shape, each of these bushings 10 and 11 being made out of porous bronze and saturated with oil such as is commonly well known and in common usage today. A characteristic of such bushings is that oil will flow increasingly from the pores of the bushings upon a temperature rise of the bushing, and also oil may be fed through the bushing from application of oil about the exterior of the bushing.

Since each of these bushings 10 and 11 are substantially identical, the description of one bushing, such as bushing 10, will be sufficient to apply to the description of the other bushing 11. This bushing 10 has a major diameter end portion 12 with a flat face 13 suitable to take end thrust if so desired. Back of the major diameter portion 12, is an intermediate diameter portion 14, and then back of that intermediate portion 14 is a still further reduced diameter portion 15 constituting in effect a sleeve.

The internal diameters of the bushings 10 and 11 are made to be such that they will receive a shaft 16 therethrough with the proper and desired revolving fit.

These two bushings 10 and 11 are interconnected in axial alignment by means of a relatively thin walled tube 17 which telescopes over the sleeve 15 of each of the bushings 10 and 11. The axial length of the tube 17 will vary, first in accordance with the desired spacing apart of the bushings 10 and 11, and second with the predetermined flow desired of lubricant to these bushings 10 and 11. Where the shaft 16 is to be operated in the vertically disposed position, and a thrust plate or other means is applied between the shaft 16 and the face 13, the bushing 10 will have to absorb more of the load than will the bushing 11, and consequently more lubrication will be required to properly lubricate the bushing 10 in respect to its inner face and the surface of the shaft 16.

In this situation, the sleeve 17 is telescoped over an end portion only of the sleeve 15 of the bushing 10 as indicated in Fig. 1, to leave an exposed area of the sleeve between the upper end of the tube 17 and the shoulder 18 presented between the portions 14 and 15 of the bushing 10. The lower end of the tube 17 is shown as being carried over the sleeve 15 of the bushing 11 to abut against the shoulder 18 of that bushing 11.

A tubular wick or sleeve 19 made out of suitable felt or wicking is applied about the tubing 17 to extend from the shoulder 18 of the bushing 11 up to the shoulder 18 of the bushing 10. It is desirable that this sleeve 19 fit around the tube 17 with a rather tight or snug fit.

A second tube, preferably of a slightly heavier wall than that of the tube 17 and designated by the numeral 20, is telescoped by its respective ends over the intermediate diameter portions 14 of each of the bushings 10 and 11, to abut respectively the shoulders 21 at the juncture of the larger diameter portion 12 and the intermediate diameter portion 14. In this manner, the tube 19 is entirely enclosed within an annular chamber between the tubes 17 and 20.

The tube 20 is provided with an opening 22 intermediate its ends as a means for filling the reservoir 23 between the tube 20 and the tube 17 with the oil or lubricant with which the felt or wicking 19 is saturated. Preferably the tube 19 is cut away immediately inside of the opening 22 so as to permit the oil to flow in readily for absorption in the member 19.

As a means for mounting the assembled bearing, a substantially semi-circular steel strap or wrapper 24 engages around substantially half of the outer side of the tube 20, Fig. 2, to extend tangentially therefrom on each side and terminate in outturned feet 25 and 26 as means for mounting the bearing.

By adjusting the distance between the ends of the tube 17 and the shoulders 18 of the bushings, the amount of lubricant to flow from the member 19 to and through the bushings 10 and 11 is controlled. As indicated in Fig. 1, close to the maximum amount of lubricant is fed from the wick 19 to the bushing 10, whereas a minimum amount is fed to the bushing 11, this minimum abount being that which will enter the bushing 11 through the exposed portion of the shoulder 18. None of the lubricant will enter the bushing 11 through the sleeve 15 in the condition shown. Therefore by spacing the ends of the tube 17 from the shoulders 18, the rate of flow or feed of the lubricant from the member 19 is controlled.

It is to be noted specifically that by use of the tube 17, a chamber is formed between it and the outer tube 20 to hold the wick 19 entirely cut off from any possible contact with the revolving shaft 16 so that at no time is there any tendency for the wick or felt 19 to become glazed on the one side or filled with metal particles or the like were the felt or wicking in direct rubbing contact with the shaft 16.

Therefore it is to be seen that the lubricant flow from the reservoir 23 is controlled by the degree of exposure of the area of either one or both of the bushings 10 and 11 to the felt or wicking carried in that reservoir. Since the lubricant is largely absorbed in the felt or wick 19, the lubricant will feed from that member 19 regardless of whether the bearing is in the upright position as indicated in Fig. 1, or whether it is turned to any other position down to the horizontal. In light duty applications of the bearing, only the shoulders of the bushings will be exposed to the felt whereas in heavy duty applications, substantially half the lengths of the sleeves at least of the bushings will be exposed.

The bushings 10 and 11 are maintained in axial alignment firmly by reason of the use of the two telescoping tubes, even though those tubes be spaced apart. The bearings 10 and 11 are engaged in the ends of the two tubes by means of pressed fits. Normally, substantially one-third of the volume of the bushing 10 or bushing 11 is oil. This means that oil may readily flow through the bushings 10 and 11 as may be required, and as above indicated, should there be any temperature rise due to friction between the shaft and either one or both of the bushings, the rate of flow of the oil will be increased by reason of the application of the heat thus produced. However, such a bearing as above described in conjunction with the drawing will operate at quite low temperatures without any increase or rise in temperature under any normal load applications.

Therefore it is to be seen that we have produced a very serviceable bearing which may be produced at a relatively low cost of production and which will run substantially noiselessly particularly in comparison with ball or roller bearings, and further wherein the lubrication problem is taken care of over extremely long periods of time. This time is measured in terms of years rather than in days, weeks, or months.

While we have herein shown and described our invention in the one best form as now known to us, it is obvious that structural changes may be employed without departing from the spirit of the invention, and we therefore do not desire to be limited to that precise form beyond the limitations which may be required by the following claims.

We claim:

1. A radial thrust bearing comprising a pair of porous, oil bearing bushings having at least two diameter sections, one section of smaller diameter than the other and constituting a sleeve, the two sections being separated by an intervening shoulder; a tube telescoped by respective end portions over the sleeves of said bushings; a tubular oil wicking fitting around said tube and having end portions thereof contacting said bushings at the end of said tube with wicking ends presented toward said shoulders; a second tube surrounding said wicking and telescoping by its ends onto said larger diameter sections of the bushings; and means engaging said second tube for mounting the bearing.

2. The structure of claim 1 in which said wicking abuts said shoulders.

3. The structure of claim 1 in which one end at least of said first tube terminates along a sleeve of a bushing in spaced relation from the shoulder thereon; the wick extending beyond said tube one end along and in contact with that sleeve thus left uncovered by the first tube.

4. The structure of claim 1 in which the outer diameter of said tube is less than the diameter of said larger diameter section of each of said bushings.

References Cited in the file of this patent
UNITED STATES PATENTS

| | | |
|---|---|---|
| 2,007,021 | Mikulasek | July 2, 1935 |
| 2,315,467 | Wahlberg et al. | Mar. 30, 1943 |